United States Patent [19]

Kepler et al.

[11] 3,973,218

[45] Aug. 3, 1976

[54] SINGLE NOZZLE FREE-VORTEX AERODYNAMIC WINDOW

[75] Inventors: C. Edward Kepler, East Hartford; Roy N. Guile, Wethersfield, both of Conn.

[73] Assignee: United Technologies Corporation, Hartford, Conn.

[22] Filed: Mar. 21, 1975

[21] Appl. No.: 561,021

[52] U.S. Cl. ...................... 331/94.5 C; 331/94.5 D; 330/4.3; 350/319
[51] Int. Cl.$^2$ ........................ H01S 3/22; G02B 5/00
[58] Field of Search ................ 331/94.5 G, 94.5 PE, 331/94.5 P, 94.5 D; 330/4.3; 315/319

[56] References Cited
UNITED STATES PATENTS
3,907,409   9/1975   Hausmann ........................... 350/319

OTHER PUBLICATIONS
Guile, et al., AIAA Paper 75–122, 13th Aerospace Sciences Meeting, Jan. 20–22 1975, 10 pages.

*Primary Examiner*—Robert J. Webster
*Attorney, Agent, or Firm*—Jack N. McCarthy

[57]  ABSTRACT

A gas laser emits an output laser beam from a low pressure region to a region having a higher pressure. This is done through an opening in the side of a laser device. Under normal circumstances, the provision of such an opening would incur a flow of air from the high pressure side, externally of the laser device, to the low pressure side within the device. To prevent this, an aerodynamic window is placed in a passageway leading from said opening in the laser device through which the laser beam passes. A gas flow is passed across said passageway which will provide a flow which represents the flow of a segment of a free-vortex flow field having a pressure differential across the segment which is equal to that between the low and high pressure regions. A single nozzle, specifically contoured to produce a segment of a free-vortex flow field directs the gas into the passageway and an opening collects the flow onto the other side of said passageway. A method of constructing such a nozzle is set forth.

3 Claims, 11 Drawing Figures

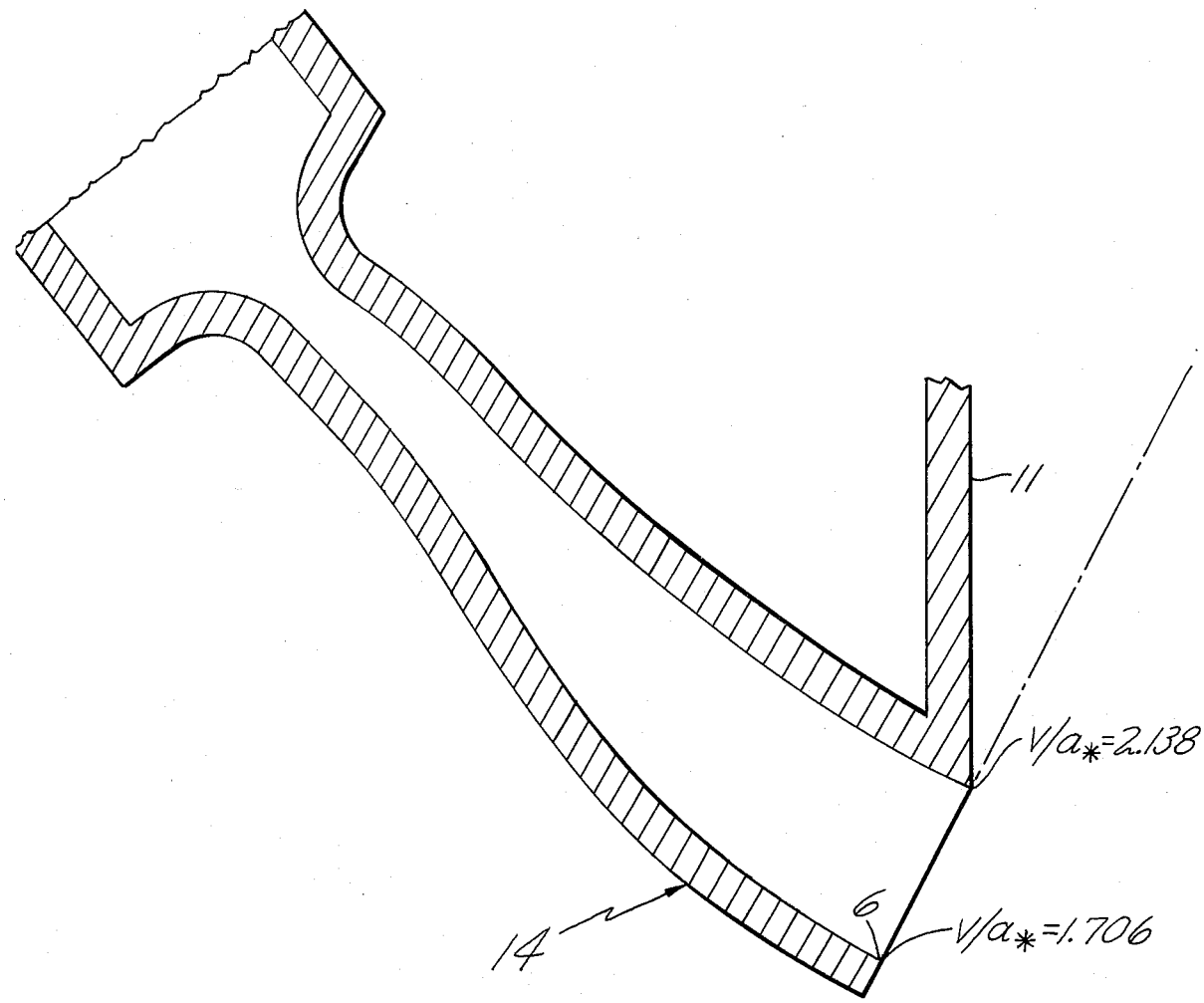

$(Va*)(r/R_0) = CONST.$

FREE VORTEX VELOCITY DISTRIBUTION

SINGLE NOZZLE FREE-VORTEX AERODYNAMIC WINDOW

BACKGROUND OF THE INVENTION

This invention relates to aerodynamic windows in general and is shown in combination with a gas laser. In lasers of low power, windows with physical walls made of materials which transmit the laser wavelength have been used, but subject window is for use when the laser beam will distort or disintegrate physical window materials. Other aerodynamic windows of this type are set forth in U.S. Pat. Nos. 3,604,789, 3,617,928, 3,654,569, 3,873,939 and application Ser. No. 437,114 now U.S. Pat. No. 3,907,409.

SUMMARY OF THE INVENTION

A primary object of this invention is to provide an aerodynamic window which would permit passage of a laser beam with no physical obstructions yet prevent or minimize flow through said window between two regions of different pressures.

In accordance with the present invention, flow of an aerodynamic window between two regions of different pressure produces a flow field which represents a segment of a free vortex by the use of an appropriately contoured free-vortex nozzle.

An object of this invention is to reduce the gas supply mass flow to be supplied to an aerodynamic window to create the gas jet which is used to isolate the low pressure region from the high pressure region.

Another object of this invention is to provide a method of constructing a free-vortex nozzle to obtain a section of supersonic free-vortex flow therefrom.

A further object of this invention is to provide a method of constructing a free-vortex nozzle by determining the velocity distribution necessary to form a section of a supersonic free-vortex flow, then constructing the internal contour of a free-vortex nozzle by first constructing the exit kernel of a nozzle flow field using the known method of characteristics and then constructing the inner and outer nozzle contours by patching segments of the contours and their contiguous flow fields to the exit kernel carrying the construction backward through the nozzle by the method of characteristics to its throat.

It is a further object of this invention to provide an aerodynamic window which will reduce laser beam quality degradation to an acceptable level.

Another object of this invention is to reduce changes in beam direction and jitter, which is fluctuation of beam direction.

It is another object of this invention to provide a compact aerodynamic window for small or focused beams.

DESCRIPTION OF THE DRAWINGS

FIG. 2 is an enlarged view of a free-vortex nozzle of the aerodynamic window;

DESCRIPTION OF THE PREFERRED EMBODIMENT

Figure 1:
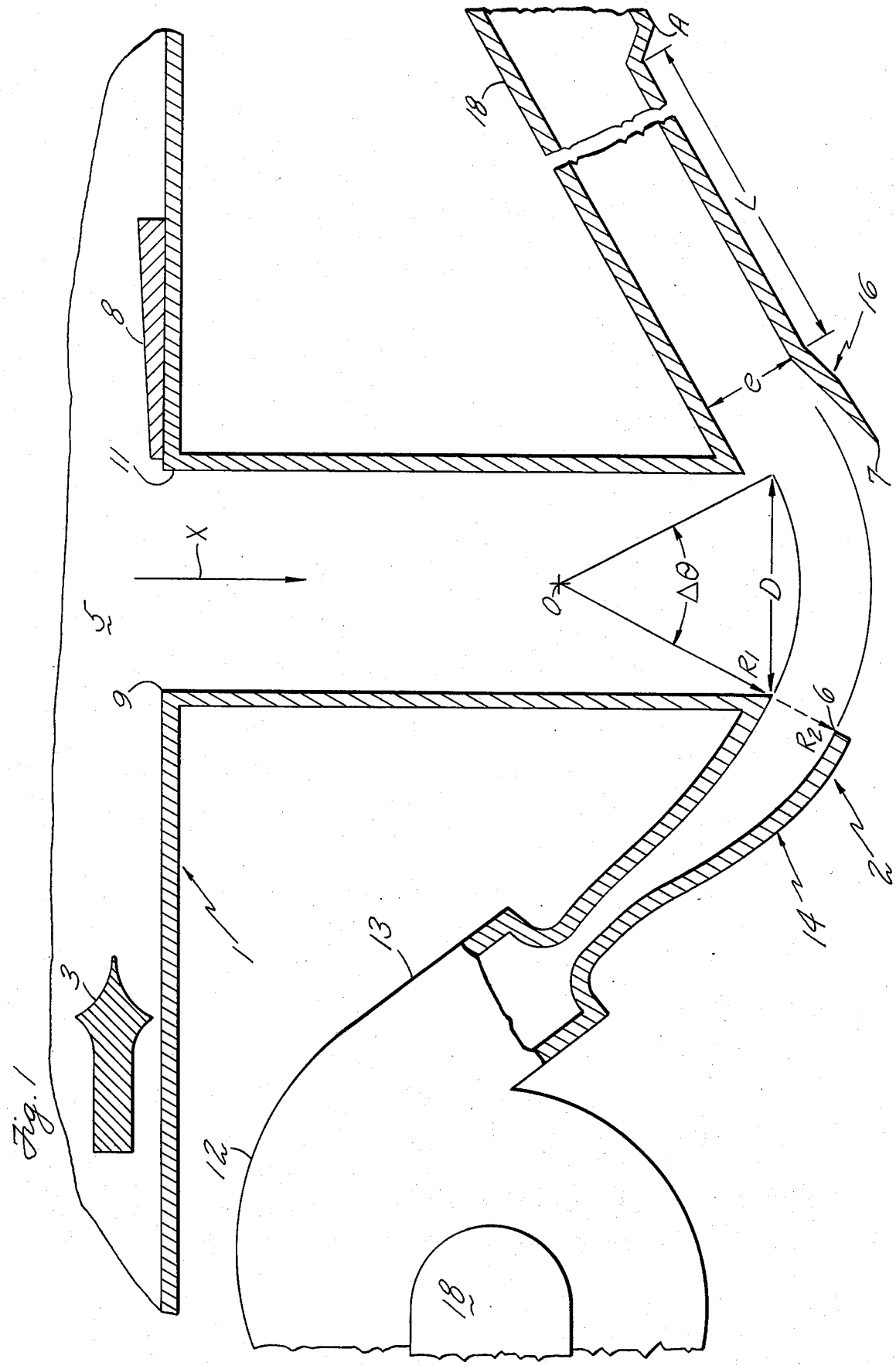
FIG. 1 is a view of the aerodynamic window as shown in relation to a laser device.
Figure 3A:
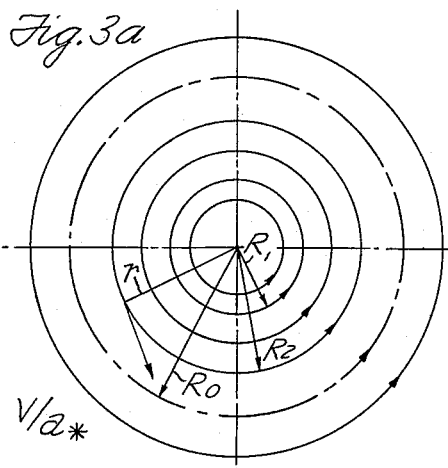
FIG. 3a is a diagram showing an end view taken through free-vortex flow field.
Figure 3B:
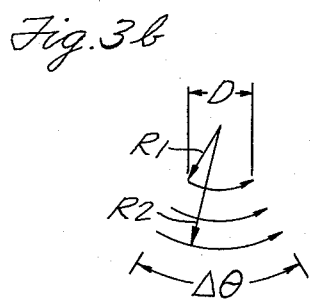
FIG. 3b is a diagram of a segment of a free-vortex flow field.
Figure 3C:
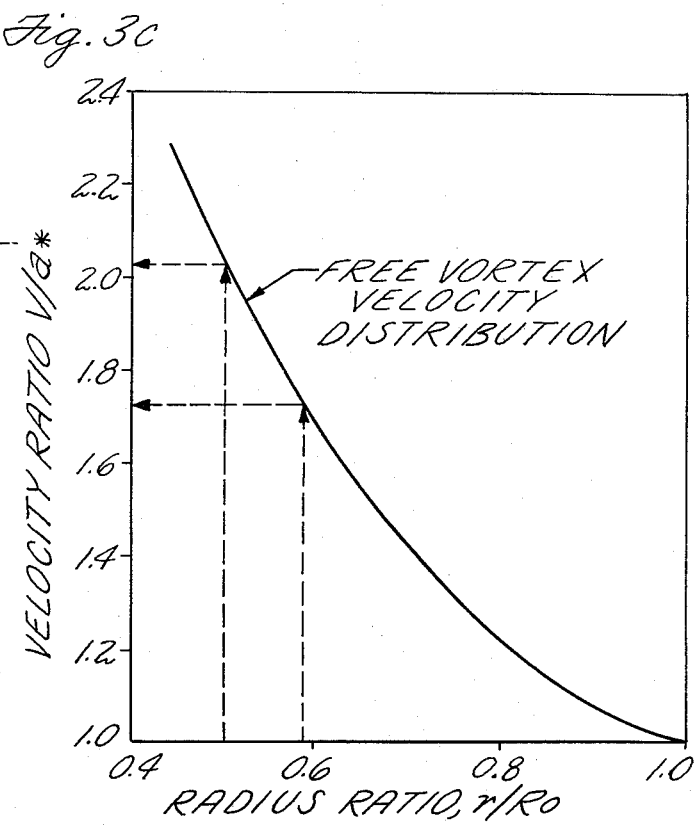
FIG. 3c is a graph showing a representative curve of free-vortex velocity distribution giving the variation of velocity ratio with radius ratio.
Figure 3D:
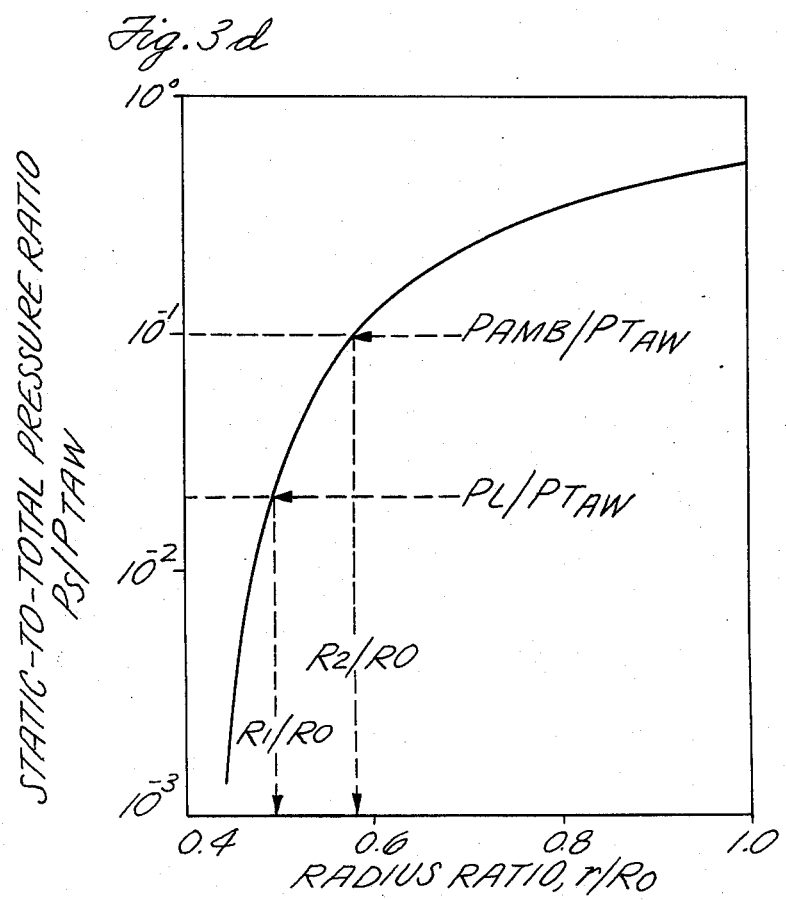
FIG. 3d is a graph showing a representative curve of free-vortex pressure distribution obtained using the velocity distribution of FIG. 3c and the isentropic flow relationships.

A gas dynamic laser 1 comprises a nozzle means 3, a laser cavity 5 and a diffuser section not shown. A similar nozzle means is disclosed in U.S. Pat. No. 3,602,432. More information on a laser construction can be found in the patents referred to above and much other prior art. The laser beam X formed in the cavity 5 is directed through an opening 9 in the side of the laser. A mirror 8 is part of the optical system which directs th beam X through the opening 9. A passageway 11 extends downwardly from and around the opening 9 through which the laser beam X passes from the cavity. A centrifugal aerodynamic window 2 is provided which is fixedly connected to the passageway 11 to form an aerodynamic boundary across said passageway so that the difference in pressure between that in the cavity 5 of the laser 1 and the pressure externally of the laser is prevented from equalizing.

The aerodynamic window 2 includes a conduit 13 having an opening 6 placed at the end of the passageway 11 through which a gas under pressure is directed across the passageway. This gas flow is received in an opening 7 on the opposite side of the passageway. A free-vortex supply nozzle 14 is located in conduit 13 adjacent the opening 6 and directs its flow therethrough into passageway 11 so as to enter opening 7. A pump 12 connected to conduit 13 supplies high pressure air or other gas, to the nozzle through said conduit 13.

Opening 7 provides an entrance to a diffuser 16 which extends from the opening 7 to the point A. This diffuser 16 serves to increase the static pressure of the flow either to permit the flow to be exhausted to the atmosphere in an open loop system or reducing the requirements of the pump 12 in a closed system such as that shown in FIG. 1. The diffuser 16 empties into a duct 18 which in turn directs the flow back into an inlet opening in the pump 12. This provides a closed loop system which will conserve aerodynamic window gas.

The aerodynamic window 2 uses its free-vortex nozzle 14 to produce a flow field across the passageway 11 which will cover the entire opening and which represents a segment of a free-vortex flow field. The characteristics of a free-vortex flow field can be described with the aid of FIG. *3a*. FIG. *3a* shows a free-vortex flow field wherein the streamlines are concentric circles and the velocity distribution is such that the product of velocity and radius is a constant. In FIG. *3a* the non-dimensional velocity is shown as the ratio of the local velocity to the well-known critical sound speed and the radius $R_0$ is that radius where the value of $v/a_= = 1.0$ so that the free-vortex flow field condition is defined by the requirement that the product of $(v/a_=)$ and $(r/R_0)$ is a constant. The resulting velocity distribution given in FIG. *3c*, can be used to determine the ratio of static-to-total pressure throughout the free-vortex flow field (FIG. *3d*) from the equation $$P_S/P_T = \left[1 - \frac{\gamma - 1}{\gamma + 1}\left(\frac{v}{a_*}\right)^2\right]^{\frac{\gamma}{\gamma - 1}}$$

for compressible isentropic flow ($\gamma$ is the ratio of specific heats).

FIG. *3b* illustrates a segment of the free-vortex flow field and is bounded by arcs of radii $R_1$ and $R_2$ and is included within an angular segment. $\Delta\theta$, of the 360°C flow field of FIG. *3a*. This segment of the free-vortex flow field is sized to span the passageway 11 of the aerodynamic window 2 with D equal to the width of the passageway 11, while having a pressure on one side equal to the pressure in the laser cavity and having the pressure on the other side equal to the pressure of the atmosphere.

The conditions defining the free-vortex flow field of which a segment is to be approximated are determined to establish appropriate size. Determination of the free-vortex flow field conditions begins with the selection of the properties of the supply gas. The gas composition, supply total temperature, $T_{T_{AW}}$, and supply total pressure, $P_{T_{AW}}$, are chosen to be compatible with the system for which the window is being constructed. For a laser system the supply gas must be transparent to the laser radiation, e.g. dry air or nitrogen for a gas dynamic laser. The ratios of laser cavity pressure to supply total pressure, $P_L P_{T_{AW}}$, and ambient pressure to supply total pressure, $P_{AMB}/P_{T_{AW}}$, are formed defining the static-to-total pressure ratios at the respective radii $R_1$ and $R_2$ bounding a segment of the free-vortex flow field. These pressure ratios define the values of $R_1/R_0$ and $R_2R_0$ as indicated in FIG. *3d*, and in turn fix the velocity ratios $v/a_=$ at $R_1$ and $R_2$ through the free-vortex flow field conditions of FIG. *3c*.

The value of $R_1$ can be calculated trigonometrically from FIG. *3b* in terms of the size, D, of the passageway 11 and the flow turning angle $\Delta\theta$. While the value of $\Delta\theta$ may be chosen arbitrarily, it is desirable to maximize $\Delta\theta$ since the mass flow required by the window varies inversely with the sine of $\Delta\theta/2$. The maximum value of $\Delta\theta$ will be influenced by losses in momentum due to turbulent dissipation of the aerodynamic window flow and must be determined experimentally. Values of $\Delta\theta$ between 60° and 70° have been used successfully. With $v/a_=$ known at $R_1$ and $R_2$, and $R_1$ found trigonometrically, the velocity-radius relationship for a free-vortex flow field (FIG. *3a*) are used to find $R_2$.

The aerodynamic window 2 uses a free-vortex supply nozzle 14 to produce the desired free-vortex flow segment across $R_1$–$R_2$. The walls of this nozzle are contoured to obtain the desired free-vortex velocity and pressure distributions at the opening 6 located at the end of passageway 11. The nozzle construction procedure is set forth here: Referring to FIG. *4a*, as characteristic of a free vortex, the product of velocity and radius at each of the points *a* through *f* lying in the exit plane is a constant and the velocity direction is perpendicular to the nozzle exit plane. As described above, the value of $R_1$ is fixed by the aperture, or passageway 11, size and the flow turning angle, while the velocity ratios $v/a_=$ at *a* and *f* are determined from the gas supply conditions, including composition of the supply gas to be used and its total (stagnation) temperature and pressure, and the laser cavity and ambient pressures.

The flow field within the region bounded by I-II, II-III and I-III in FIG. *4a* is found at the intersections of the left-running and right-running characteristics which pass through the points *a* through *f* of the exit plane. These characteristics are uniquely defined by the flow conditions at the points *a* through *f*. The boundaries of the exit kernel so formed are determined from the intersections of right-running characteristics passing through the points *a* through *f* with the left-running characteristic passing through *a* (line I-III) and the intersections of the left-running characteristics passing through the points a through *f* with the right-running characteristic passing through *f* (line II-III). Note that, while only six points within the nozzle exit plane are shown in FIG. *4a*, a finer mesh containing 25 points was employed in the computer code developed for designing the free-vortex supply nozzle.

The next step in forming the nozzle is the selection of the inner and outer wall contours passing through points *a* and *f* respectively. At this stage of the construction, the choice of a wall shape is arbitrarily provided the tangent to the contour is perpendicular to the nozzle exit plane at points *a* and *f*. This tangency requirement is satisfied if the wall contours are circular arcs whose centers of curvature are located along the nozzle exit plane.

In the example described, wall contours comprised of circular arcs were used. The centers of curvature O′ and O″, of these arcs forming outer and inner contours respectively, are located along the extension of the side of the angle $\Delta\theta$ of FIG. 1 which passes through the nozzle exit plane. Values of the radii, $R_U$ and $R_L$, of the outer and inner contours having the centers O′ and O″ are selected arbitrarily and the flow field within the kernel bounded by the contour is computed using the known method of characteristics. Efficient nozzle shapes are restricted to those which do not cause a decrease in Mach number in the flow direction along the inner and outer contours. In order that the Mach number not decrease in the flow direction, $R_U$ must be less than or equal to $R_2$ and $R_L$ must be greater than or equal to $R_1$.

Figure 4A:
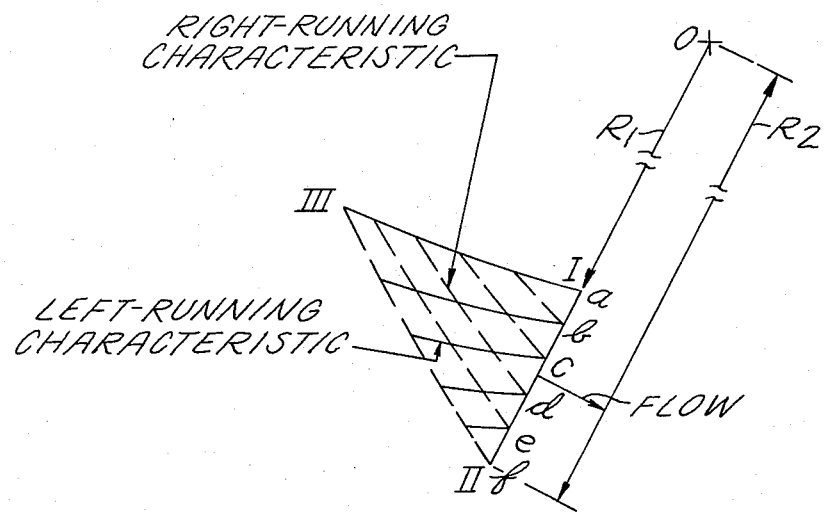
FIG. 4a is a view showing the exit kernel (I-II; II-III and III-I) of the nozzle flow field which is the region bounded by the exit plane, the right-running characteristic passing through $f$, and the left-running characteristic passing through $a$.
Figure 4B:
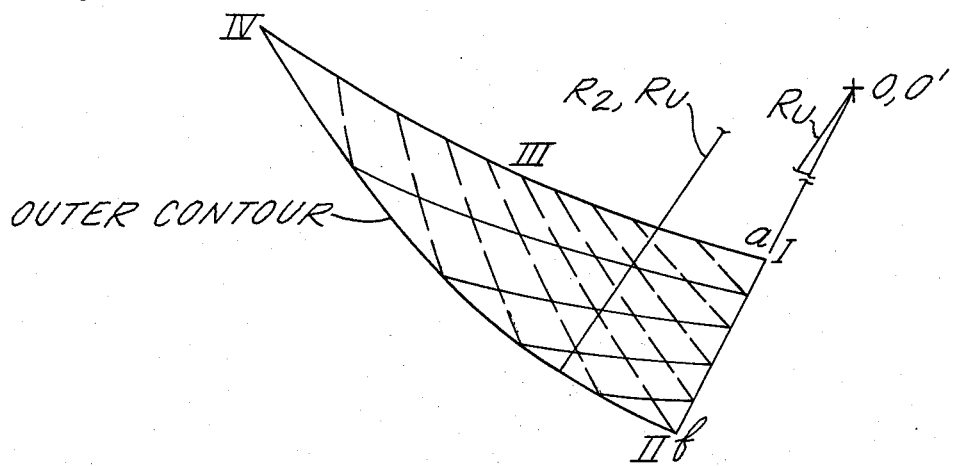
FIG. 4b is a view showing the exit kernel and a second kernel (II-III; III-IV and IV-II) of the nozzle flow field which is the region bounded by the right-running characteristic passing through $f$, the extension of the left-running characteristic passing through $a$, and the outer contour of the nozzle flow having the radius $R_U$.

For an outer wall radius, $R_U$, centered at $O'$ the flow conditions within the kernel defined by II-III; III-IV and IV-II in FIG. 4b are computed using the flow conditions existing along the right-running characteristic of the exit kernel which passes through point $f$ (II-III). In this example, $R_U$ is taken equal to $R_2$ and $O'$ is coincident with $O$. The point IV on the outer wall (terminating the arc of radius $R_U$) is located during the construction at the intersection of the wall and the left-running characteristic passing through $a$.

Figure 4C:
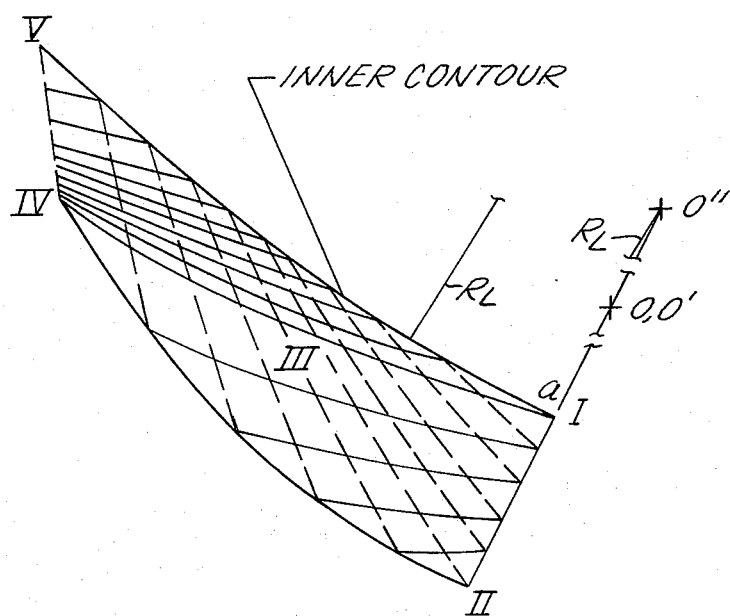
FIG. 4c is a view showing the exit kernel, second kernel and a third kernel (I-III-IV; IV-V and I-V) of the nozzle flow field which is the region bounded by the left-running characteristic passing through $a$, the inner contour of the nozzle flow having the radius $R_L$, and the right-running characteristic (IV-V) passing through the intersection of the outer contour and the left-running characteristic passing through $a$.

Similarly, by prescribing the radius of curvature of the inner wall, $R_L$, centered at $O''$ and using the flow conditions along the left-running characteristic I-III-IV, the flow field within the kernel bounded by I-III-IV, IV-V and I-V is computed as indicated in FIG. 4c. Point V on the inner contour (terminating the arc of radius $R_L$) is located during the construction at the intersection of the wall and the right-running characteristic passing through IV. In choosing the outer and inner wall contours described by $R_U$ and $R_L$, care must be taken to insure that the intersection of like characteristics, (e.g., the intersection of two left-running characteristics) does not occur within the flow field.

Figure 4D:
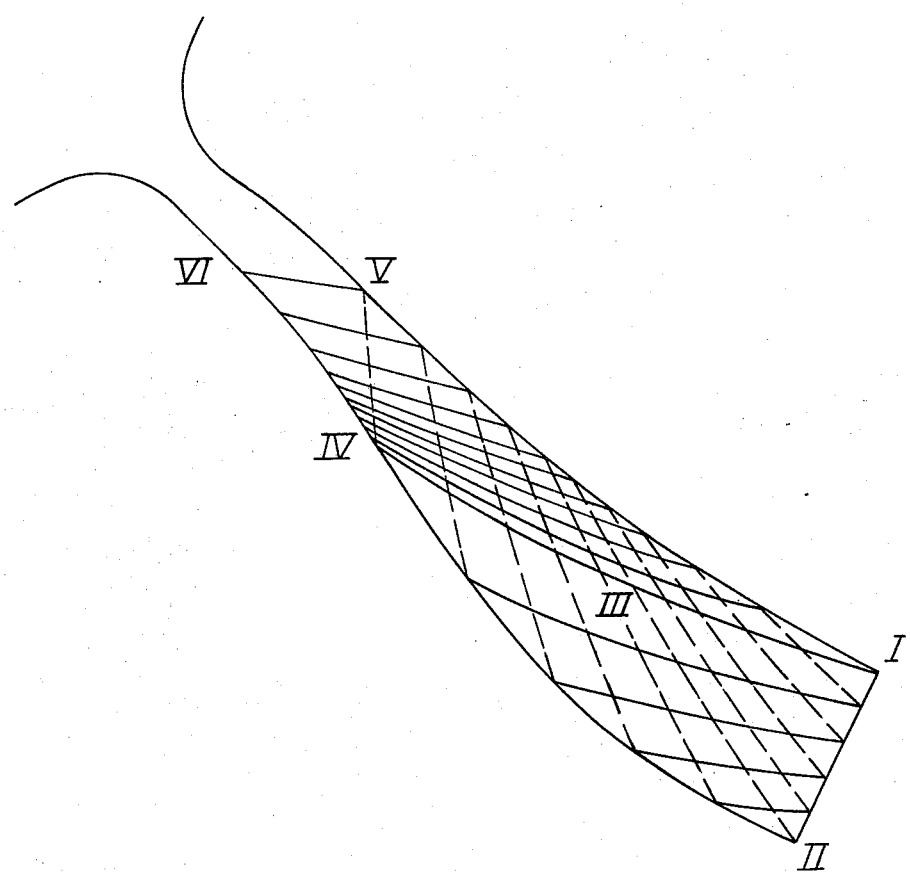
FIG. 4d is a view showing the exit kernel, second kernel, third kernel and a fourth kernel and conventional uniform flow nozzle; the fourth kernel (IV-V; V-VI and VI-IV) of the nozzle flow field is a so-called simple flow region constructed by the rearward projection of the left-running characteristics which intersect the right-running characteristic IV-V. As required for a simple flow region, the rearward projection of these left-running characteristics is terminated where conservation of mass is satisfied and no reflection of right-running characteristics occurs. The termination of the characteristics defines the portion of the nozzle wall VI-IV. The conventional uniform flow nozzle is patched to the simple flow region along the left-running characteristic VI-V. This uniform nozzle represents one-half of the usual supersonic wind tunnel or perfect nozzle in that one wall (terminating at VI) is flat and is substituted for the line of symmetry of the wind tunnel nozzle.

The circular arcs of the inner and outer contours may be extended further back into the nozzle beyond V and IV if intersection of like characteristics does not occur or, alternatively, some other radius of curvature or contour shape may be selected. The solution to the flow conditions would proceed as described above. In order to arrive at a uniform nozzle throat velocity profile, however, the solution must eventually degenerate to a simple wave region within which either left- or right-running characteristics (but not both) exist. This simple flow region is constructed from the rearward projection of the left-running characteristics passing through IV-V and the wall is defined at the termination of these characteristics. These characteristics must be terminated so that the nozzle mass flow is conserved. This simple wave region is bounded by IV-V, V-VI and VI-IV as indicated in FIG. 4d. Since the flow conditions along V-VI are everywhere constant, line V-VI can be used as the terminating characteristic of a conventional converging-diverging nozzle designed to produce uniform flow at conditions identical to those existing along line V-VI. This patching of the nozzle portion bounded by I-II-IV-VI-V-I with a uniform flow nozzle completes the design of the free-vortex supply nozzle. The uniform nozzle consists of one-half of the conventional wind tunnel nozzle formed by placing a flat wall along the line of symmetry of the wind tunnel nozzle.

The nozzle shape determined above was evolved ignoring viscous effects (boundary layer growth). The next step in completing the construction is the calculation of the boundary layer growth along the inner and outer contours. The contours are then corrected to account for the boundary layer. If the boundary layers are too thick to enable the application of standard correction procedures, then the nozzle shape should be redesigned by choosing different values for the wall radii and repeating the above method.

While a nozzle contour having sections comprised of singular circular arcs on both inner and outer contours was used in the example discussed above, other combinations having more than one circular arc radius on each contour or even shapes other than circular arcs could be employed for the nozzle contours provided that such other shapes result in a free-vortex flow field at the nozzle exit. The design procedure employing the method of characteristics would be similar to that set forth above.

In an aerodynamic window constructed using the above procedure, the passageway 11 was 3.8 cm in width, the supply total pressure was 10 atm, and a flow turning angle $\Delta\theta$ of 60° was employed. The exit plane of the nozzle 14 was positioned along an extension of a side of the angle $\Delta\theta$. The radius $R_1$ was 3.8 cm and the radius $R_2$ was 4.76 cm. An aerodynamic window of this type was built to seal a cavity at a pressure of 1/15 atm from the atmosphere. The nozzle had an outer wall radius $R_U$ of 3.8 cm and an inner wall radius $R_L$ of 10.02 cm with simple flow regions along both outer and inner walls patched to a uniform nozzle having a velocity ratio of $v/a_= = 1.493$. The velocity ratios at the exit of the nozzle corresponded to the flow conditions dictated by the choise of the 10 atm supply pressure and the pressures of the laser cavity and atmospheric surroundings. The diffuser 16 of FIG. 1 has a long intermediate section L which was made approximately ten times the width of the throat $e$ to facilitate exhaust of the aerodynamic window flow.

We claim:

1. In combination in a gas laser device, a lasing region of low pressure, an outlet for an output laser beam in said laser device forming an exit to a second region of a different pressure, an outlet passageway connected to said laser device and extending away therefrom around said outlet, means comprising a single free-vortex nozzle for providing an arcuate gas flow across said passageway which represents the flow of a segment of a free-vortex flow field having a pressure differential which is equal to that between the lasing region and the second region.

2. A combination as set forth in claim 1 wherein said nozzle has its exit plane along a radius which forms one side of the segment of a free-vortex flow field and passes through the center of curvature of the segment of a free-vortex flow field.

3. In combination in a system having a region of low pressure, an opening in said region forming an exit, an outlet passageway connected to said system and extending away therefrom around said opening, and an aerodynamic window assembly permitting passage therethrough to a region of higher pressure, said aerodynamic window assembly comprising a single free-vortex supply nozzle for providing an arcuate gas flow across said passageway which represents the flow of a segment of a free-vortex flow field having a pressure differential which is equal to that between the lasing region and the second region.

* * * * *